United States Patent
Cook et al.

(10) Patent No.: US 9,688,282 B2
(45) Date of Patent: *Jun. 27, 2017

(54) DRIVER RISK ASSESSMENT SYSTEM AND METHOD EMPLOYING AUTOMATED DRIVER LOG

(71) Applicant: Lytx, Inc., San Diego, CA (US)

(72) Inventors: Bryon Cook, San Diego, CA (US); Jamie Etcheson, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/969,570

(22) Filed: Dec. 15, 2015

(65) Prior Publication Data

US 2016/0101787 A1  Apr. 14, 2016

Related U.S. Application Data

(63) Continuation of application No. 14/225,057, filed on Mar. 25, 2014, now Pat. No. 9,245,391, which is a
(Continued)

(51) Int. Cl.
*B60Q 1/00*      (2006.01)
*B60W 40/09*    (2012.01)
(Continued)

(52) U.S. Cl.
CPC ....... *B60W 40/09* (2013.01); *G06Q 10/06393* (2013.01); *G06Q 10/10* (2013.01);
(Continued)

(58) Field of Classification Search
CPC . B60W 40/09; G06Q 10/06393; G06Q 10/10; G07C 5/00; G07C 5/085;
(Continued)

(56) References Cited

U.S. PATENT DOCUMENTS 7,826,948 B2   11/2010  Messih
8,140,358 B1*   3/2012  Ling ..................... G06Q 40/08
                                                340/439

(Continued)

*Primary Examiner* — Anh V La
(74) *Attorney, Agent, or Firm* — Van Pelt, Yi & James LLP

(57) ABSTRACT

A Driver Risk Assessment System and Method Employing Automated Driver Log. The system and method provides robust and reliable event scoring and reporting, while also optimizing data transmission bandwidth. The system includes onboard vehicular driving event detectors that record data related to detected driving events, vehicle condition and/or tasking, roadway environmental conditions, selectively store or transfer data related to said detected driving events. If elected, the onboard vehicular system will "score" a detected driving event, compare the local score to historical values previously stored within the onboard system, and upload selective data or data types if the system concludes that a serious driving event has occurred. The system may respond to independent user requests by transferring select data to said user at a variety of locations and formats. Furthermore, by tracking driver identity and other environmental factors, the system may be configured to generate a driver score, a driver log, and a dispatch log. The driver score can be normalized by consideration of environmental factors related to the strenuousness of the driver's driving or the driving challenges experienced by the driver during his or her driving trip.

19 Claims, 7 Drawing Sheets

Related U.S. Application Data continuation of application No. 12/793,362, filed on Jun. 3, 2010, now Pat. No. 8,854,199, and a continuation-in-part of application No. 12/691,639, filed on Jan. 21, 2010, now Pat. No. 8,849,501, which is a continuation-in-part of application No. 12/359,787, filed on Jan. 26, 2009, now Pat. No. 8,269,617.

(51) Int. Cl.
*G06Q 10/10* (2012.01)
*G07C 5/08* (2006.01)
*G06Q 10/06* (2012.01)
*G07C 5/00* (2006.01)

(52) U.S. Cl.
CPC ............... *G07C 5/00* (2013.01); *G07C 5/085* (2013.01); *G07C 5/0808* (2013.01)

(58) Field of Classification Search
CPC ...... G07C 5/0808; B60K 28/06; B60K 28/02; B60K 2350/901; B60K 31/042; G08G 1/0129; G08G 1/0175; G08B 21/06
USPC .................... 340/425.5, 439, 438, 441; 701/1
See application file for complete search history.

(56) References Cited

U.S. PATENT DOCUMENTS

| | | |
|---|---|---|
| 8,269,617 B2 | 9/2012 | Cook |
| 8,564,426 B2 | 10/2013 | Cook |
| 9,245,391 B2* | 1/2016 | Cook ..................... G06Q 10/10 |
| 2005/0219058 A1 | 10/2005 | Katagiri |
| 2007/0268158 A1* | 11/2007 | Gunderson ............ G06Q 40/08 340/933 |
| 2009/0040054 A1* | 2/2009 | Wang ................. B60W 30/095 340/576 |

* cited by examiner

DRIVER RISK ASSESSMENT SYSTEM AND METHOD EMPLOYING AUTOMATED DRIVER LOG

CROSS REFERENCE TO OTHER APPLICATIONS

This application is a continuation of U.S. patent application Ser. No. 14/225,057, entitled DRIVER RISK ASSESSMENT SYSTEM AND METHOD EMPLOYING AUTOMATED DRIVER LOG filed Mar. 25, 2014 now U.S. Pat. No. 9,245,391 which is incorporated herein by reference for all purposes, which is a continuation of U.S. patent application Ser. No. 12/793,362, now U.S. Pat. No. 8,854,199, entitled DRIVER RISK ASSESSMENT SYSTEM AND METHOD EMPLOYING AUTOMATED DRIVER LOG filed Jun. 3, 2010 which is incorporated herein by reference for all purposes, which is a continuation in part of U.S. patent application Ser. No. 12/359,787, now U.S. Pat. No. 8,269,617, entitled METHOD AND SYSTEM FOR TUNING THE EFFECT OF VEHICLE CHARACTERISTICS ON RISK PREDICTION filed Jan. 26, 2009 which is incorporated herein by reference for all purposes. U.S. patent application Ser. No. 12/793,362 is also a continuation in part of U.S. application Ser. No. 12/691,639, now U.S. Pat. No. 8,849,501, entitled DRIVER RISK ASSESSMENT SYSTEM AND METHOD EMPLOYING SELECTIVELY AUTOMATIC EVENT SCORING filed Jan. 21, 2010, which is also a continuation in part of U.S. application Ser. No. 12/359,787, now U.S. Pat. No. 8,269,617, entitled METHOD AND SYSTEM FOR TUNING THE EFFECT OF VEHICLE CHARACTERISTICS ON RISK PREDICTION filed Jan. 26, 2009.

BACKGROUND OF THE INVENTION

1. Field of the Invention

This invention relates generally to systems for analyzing driving events and risk and, more specifically, to a Driver Risk Assessment System and Method Employing Automated Driver Log.

2. Description of Related Art

The surveillance, analysis and reporting of vehicular accidents and "events" has, for some time, been the focus of numerous inventive and commercial efforts. These systems seek to monitor a vehicle's condition while being driven by a driver, and then record and report whenever a "hazardous" condition is detected. What vehicle (and/or driver) symptoms are to constitute a "hazardous" event or condition is defined in the context of a particular monitoring system. Each system will monitor one or more sensor devices located in the vehicle (e.g. shock sensors, location sensors, attitude/orientation sensors, sound sensors), and will generally apply a threshold alarm level (of a variety of levels of sophistication) to the sensor(s) output to assign an event or a non-event. Prior systems of note include the following patents and printed publications: Guensler, et al., US2007/0216521 describes a "Real-time Traffic Citation Probability Display System and Method" incorporates environmental factors and geocentric risk elements to determine driver risk of citation in real-time. Gunderson, et al., US2007/0257804 describes a "System and Method for Reducing Driving Risk with Foresight." The Gunderson system and method introduces driver coaching into the driver risk analysis system and method. Warren, et al., US2007/0027726 is a system for "Calculation of Driver Score Based on Vehicle Operation for Forward-looking Insurance Premiums." Warren calculates insurance premiums using geomapping to subdivide underwriting areas. Gunderson, et al., US2007/0271105 is a "System and Method for Reducing Risk with Hindsight" that provides forensic analysis of a vehicle accident, including video of the driver and area in front of the vehicle. Gunderson, et al., US2007/0268158 is a "System and Method for Reducing Risk with Insight." This Gunderson method and system monitors driving for the purpose of analyzing and reporting events on a driver-centric basis. Gunderson, et al., US2007/0257815 is a "System and Method for Taking Risk out of Driving," and introduces the creation of a driver coaching session as part of the driving monitoring system. Warren, et al., US2006/0253307 describes "Calculation of Driver Score based on Vehicle Operation" in order to assess driver risk based upon a vehicle/driver geolocation and duration in risky locations. Warren, et al., US20060053038 is related to the '307 Warren, that further includes activity parameters in determining driver risk. Kuttenberger, et al., is a "Method and Device for Evaluating Driving Situations." This system does calculate driving risk based upon accelerometers and other vehicle characteristics. Finally, Kuboi, et al. is a "Vehicle Behavior Analysis System" that includes GPS, video and onboard triggers for notification/storing/uploading data related to the vehicle behavior.

There are other prior references dealing with the analysis of the detected data to identify occurrences that would be classified as "driving events" of significance to the driver or driver's supervisory organization. These references include: Raz. et al. U.S. Pat. No. 7,389,178 for "System and Method for Vehicle Driver Behavior Analysis and Evaluation", Raz, et al. U.S. Pat. No. 7,561,054 for "System and Method for Displaying a Driving Profile," and Raz, et al., U.S. Patent Application Publication No. 2007/0005404 for "System and Method for Providing Driving Insurance." All of these Raz references are based upon a system and method that analyzes the raw data collected by the vehicle data sensors and generates a "string" of "maneuvers" that the system recognizes from a database of data that has been previously been identified as representing such maneuvers.

A detailed review of each of these prior systems has been conducted, and while each and every one of them discloses what is purported to be a novel system for vehicle risk monitoring, reporting and/or analysis, none of these prior systems suggests a system that not only identifies and reports risky driving behavior, but also creates a driver score based not only upon the frequency and severity of driving events, but also adjusted (if appropriate) for different external factors that may cause the driver to experience particularly challenging or easy driving conditions.

SUMMARY OF THE INVENTION

In light of the aforementioned problems associated with the prior systems and methods, it is an object of the present invention to provide a Driver Risk Assessment System and Method Employing Automated Driver Log. The system and method should provide robust and reliable event scoring and reporting, while also optimizing data transmission bandwidth. The system should include onboard vehicular driving event detectors that record data related to detected driving events, vehicle condition and/or tasking, roadway environmental conditions, selectively store or transfer data related to said detected driving events. If elected, the onboard vehicular system should "score" a detected driving event, compare the local score to historical values previously stored within the onboard system, and upload selective data or data types if the system concludes that a serious driving event has occurred. The system should respond to independent user requests by transferring select data to said user at a variety of locations and formats. Furthermore, by tracking driver identity and other environmental factors, the system should be configured to generate a driver score, a driver log, and a dispatch log. Preferably, the driver score should be normalized by consideration of environmental factors related to the strenuousness of the driver's driving.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Driver Risk Assessment System and Method Employing Automated Driver Log.

Figure 1:
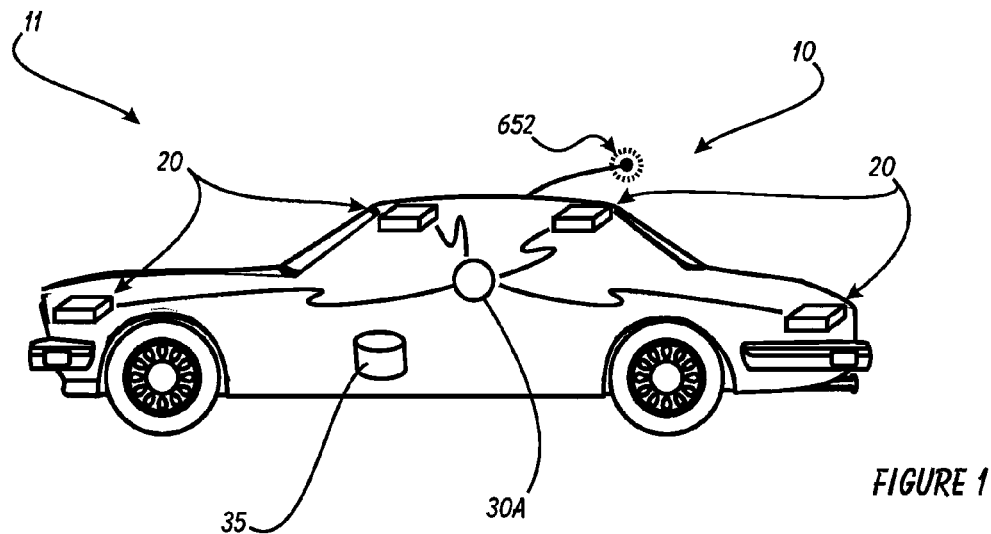
FIG. 1 is a block diagram of a conventional vehicle having a preferred embodiment of the system of the present invention installed therein.

The present invention can best be understood by initial consideration of FIG. 1. FIG. 1 is a block diagram of a conventional vehicle 10 having a preferred embodiment of the system 11 of the present invention installed therein. The event detector 30A is in control of a one or more event capture devices 20 that are attached to the vehicle 10. The event detector 30A communicates with the capture devices 20 via wired or wireless interface. There is a data storage area 35 also associated with the event detector 30A, as will be expanded upon below in connection with other drawing figures.

The event detector 30A can be any of a variety of types of computing devices with the ability to execute programmed instructions, receive input from various sensors, and communicate with one or more internal or external event capture devices 20 and other external devices (not shown). The detector 30A may utilize software, hardware and/or firmware in a variety of combinations to execute the instructions of the disclosed method.

An example general purpose computing device that may be employed as all or a portion of an event detector 30A is later described in connection with the discussion related to FIG. 4, hereinbelow. Similarly, an example general purpose wireless communication device that may be employed as all or a portion of an event detector 30A is later described in connection with the discussion related to FIG. 5 hereinbelow.

When the event detector 30A identifies an event, the event detector 30A instructs the one or more event capture devices 20 to record pre-event data, during the event data, and post-event data that is then provided to the event detector 30A and stored in the data storage area 35. In reality, the event capture devices 20 constantly save data in a buffer memory, which allows the system to actually obtain data that was first-recorded (into a buffer memory) prior to the event itself.

Events may comprise a variety of situations, including automobile accidents, reckless driving, rough driving, or any other type of stationary or moving occurrence that the owner of a vehicle 10 may desire to know about, and is more fully described below in connection with other drawing figures.

The system 11 installed within the vehicle 10 may have a plurality of event capture devices 20 placed in various locations around the vehicle 10. An event capture device 20 may comprise a video camera, still camera, microphone, and other types of data capture devices. For example, an event capture device 20 may include an accelerometer that senses changes in speed, direction, and vehicle spatial orientation. Additional sensors and/or data capture devices may also be incorporated into an event capture device 20 in order to provide a rich set of information about a detected event. In that event capture devices 20 may include the capability to record video data, certain of these devices 20 may be used in concert with the event detector 30A to record data to be used in order to identify the driver. For example, video data could be obtained of the driver's face in order to conduct facial recognitions analysis/processing. As the system 11 becomes more automated, and particularly with regard to the features provided by the instant embodiment, coupling the identity of the driver to any event data is critical.

The data storage area 35 can be any sort of internal or external, fixed or removable memory device and may include both persistent and volatile memories. The function of the data storage area 35 is to maintain data for long term storage and also to provide efficient and fast access to instructions for applications or modules that are executed by the event detector 30A.

Figure 2:
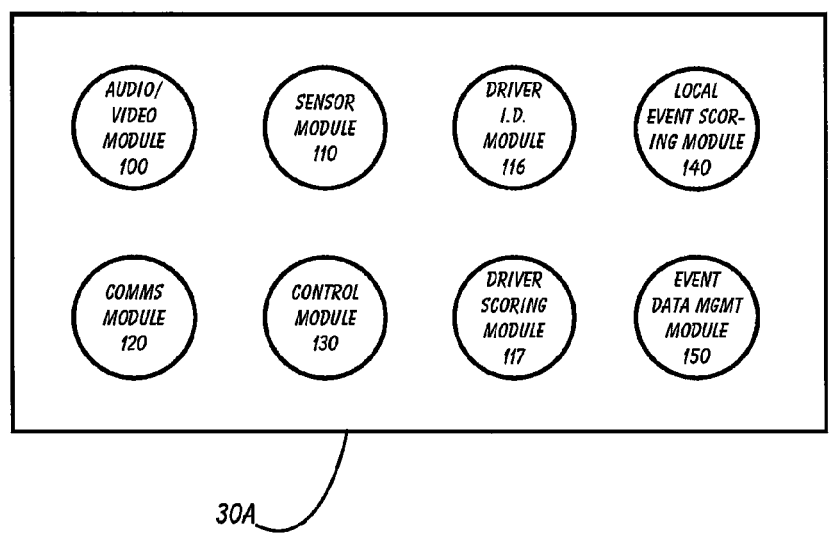
FIG. 2 is a block diagram illustrating an example event detector according to an embodiment of the present invention.

In one embodiment, event detector 30A in combination with the one or more event capture devices 20 identifies an event and stores certain audio and video data along with related information about the event. For example, related information may include the speed of the vehicle when the event occurred, the direction the vehicle was traveling, the location of the vehicle (e.g., from a global positioning system "GPS" sensor), and other information from sensors located in and around the vehicle or from the vehicle itself (e.g., from a data bus integral to the vehicle such as an on board diagnostic "OBD" vehicle bus). This combination of audio, video, and other data is compiled into an event that can be stored in data storage 35 onboard the vehicle for later delivery to an evaluation server. Data transfer to a remote user or server could be via conventional wired connection, or via conventional wireless connections (such as using antennae 652). Turning to FIG. 2, we can examine some of the internal details regarding the event detector 30A.

FIG. 2 is a block diagram illustrating an example event detector 30A according to an embodiment of the present invention. In the illustrated embodiment, the event detector 30A comprises an audio/video ("AV") module 100, a sensor module 110, a communication module 120, a control module 130, and a spatial behavior module (not shown). Additional modules may also be employed to carry out the various functions of the event detector 30A, as will be understood by those having skill in the art.

The AV module 100 is configured to manage the audio and video input from one or more event capture devices and storage of the audio and video input. The sensor module 110 is configured to manage one or more sensors that can be integral to the event detector 30A or external from the event detector 30A. For example, an accelerometer may be integral to the event detector 30A or it may be located elsewhere in the vehicle 10. The sensor module 110 may also manage other types of sensor devices such as a GPS sensor, temperature sensor, moisture sensor, and the OBD, or the like (all not shown).

The communication module 120 is configured to manage communications between the event detector 30A and other devices and modules. For example, the communication module 120 may handle communications between the event detector 30A and the various event capture devices 20. The communication module 120 may also handle communications between the event detector 30A and a memory device, a docking station, or a server such as an evaluation server. The communication module 120 is configured to communicate with these various types of devices and other types of devices via a direct wire link (e.g., USB cable, firewire cable), a direct wireless link (e.g., infrared, Bluetooth, ZigBee), or a wired or any wireless network link such as a local area network ("LAN"), a wide area network ("WAN"), a wireless wide area network ("WWAN"), an IEEE 802 wireless network such as an IEEE 802.16 ("WiFi") network, a WiMAX network, satellite network, or a cellular network. The particular communications mode used will determine which, if any, antennae 652 is used.

The control module 130 is configured to control the actions or remote devices such as the one or more event capture devices. For example, the control module 130 may be configured to instruct the event capture devices to capture an event and return the data to the event detector when it is informed by the sensor module 110 that certain trigger criteria have been met that identify an event.

The Local Event Scoring Module 140 and the Event Data Management Module 150 were first introduced in the Continuing Applications. While these two modules 140, 150 are referred to as separate subsystems, it should be understood that some or all of the functionality of each could be integrated into the Control Module 130 (or other subsystem associated with the event detector 30A).

The Local Event Scoring Module 140 will review the raw data streams from the individual sensors 20 (see FIG. 1), or the sensor module 110, and will use one or more mathematic algorithms to calculate a local event score. While this local event score is not expected to be as robust or potentially accurate as the remote event scoring system described by the Parent Applications, it is not necessarily a requirement that this be the case, because a remote score may still be determined independent of the local score. The purpose for calculating the local event score is to enable the event detector 30A to optimize the use of the data transfer bandwidth by only selectively uploading the full event data to the remote server for review/display/analysis. Through extensive observation, the values produced by the various sensors (either alone or in combination) can be analyzed mathematically to produce a product that accurately predicts whether or not a serious accident or other driving event has occurred. Combinations of acceleration, velocity, video and event sound can reliably detect that an accident has happened.

If the local event scoring module 140 determines that the local event score of a particular driving event meets predetermined criteria, it will direct the Event Data Management Module 150 to upload the appropriate data received from the sensors 20 (see FIG. 1) and stored locally within the vehicle (within a storage device associated with the event detector 30A).

The Event Data Management Module 150 may also be responsive to a remote request for additional data. For example, in circumstances where the remote user (i.e. remote to the vehicle being monitored) may receive a notice of a particular "incident" of interest, that remote user may be able to manually request audio, video or other locally-recorded data. This requested data would then be transmitted (via the communications module 120) to the remote user for review/analysis/display.

The Driver I.D. Module 116 is a new feature incorporated into the present invention. While the specific details will be discussed more fully below in connection with FIG. 9, we will summarize here for the purpose of understanding the general functional scope and purpose of this feature. The Driver I.D. Module 116 determines the vehicle driver's identity (or perhaps disables the vehicle if the driver's I.D. is either not obtainable, or not recognized as being associated with an authorized driver of the vehicle). While, generally speaking, all driving events identified by the system 10 will be associated with the particular vehicle, in the instant system 11 there is the added feature that each driver's performance and statistics will be analyzed and reported on its own. With this new system, the drivers and/or their managers will be able to periodically check on the driving performance of each individual driver, as well as generate appropriate auditing or regulatory reports for each driver.

Regarding the performance monitoring of each driver, it is believed that substantial value is added by the instant system. Rather than simply tabulating and reporting the risky driving event data for each driver, this system refines this analysis substantially by normalizing each driver's data based upon a number of factors that will be described more fully below. The purpose of the normalization is to give credit to drivers that are placed in driving circumstances that more difficult than their peers. The thinking is that the more difficult the driving circumstances, the more likely that a driver is to have a risky driving event. The converse is also taken into account—that drivers who tend to have less challenging driving circumstances should be free (or nearly so) from risky driving events.

Figure 3:
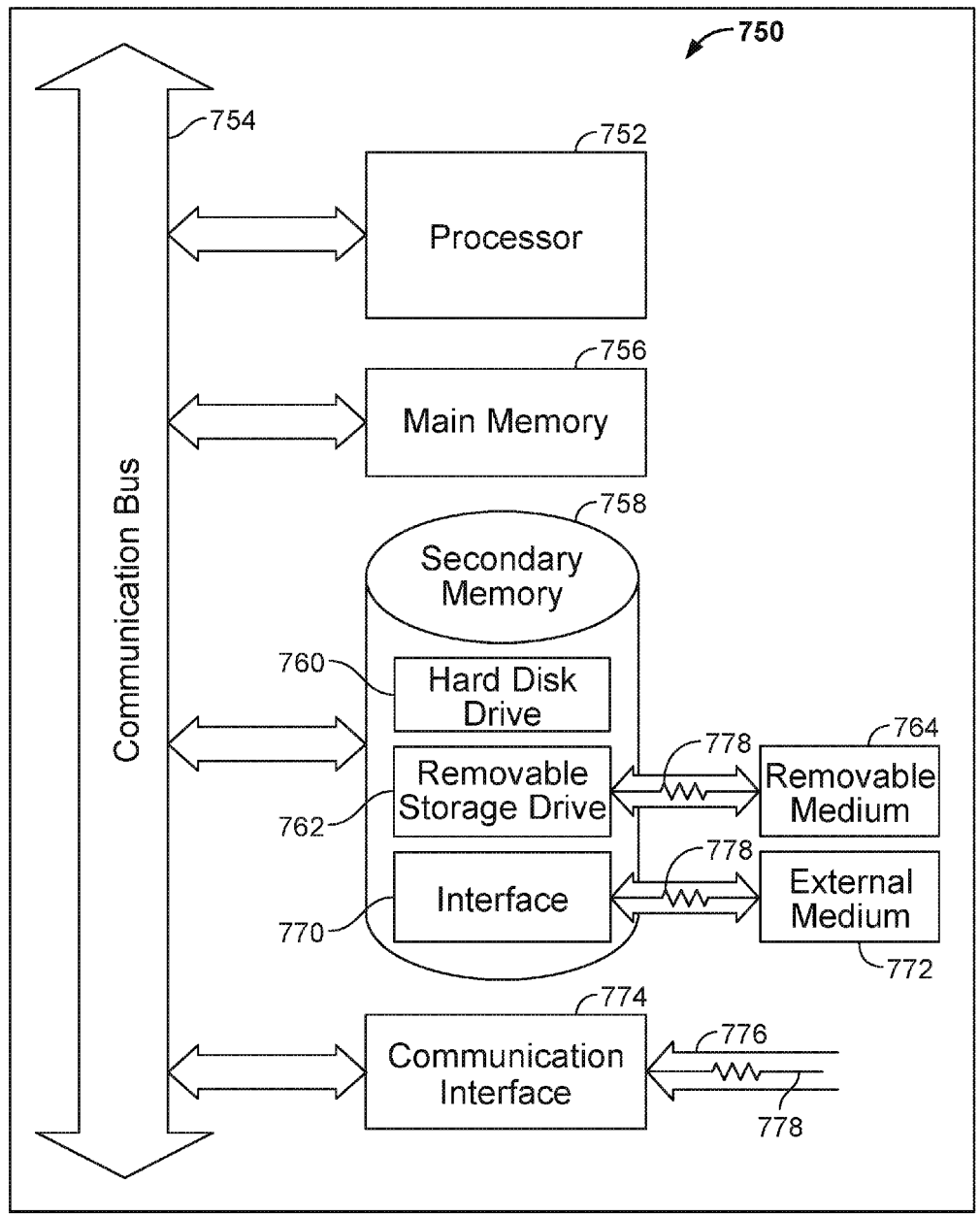
FIG. 3 is a block diagram of a conventional computing device suitable for executing the method described herein.

As discussed in the Continuing Applications, the event detector 30A has the ability to reduce, or at least regulate, the amount of data that flows from it to the remote user(s). When fully enabled, for example, large bandwidth data streams such as video and audio data will not regularly be transmitted to the remote server unless by direction of either the Local Event Scoring Module 140, or by manual or remote user request. This reduction of flow translates into significant cost savings, since most of these systems utilize expensive cellular telephone or satellite networks for vehicle-to-remote server communications. FIGS. 3 and 4 depict conventional hardware used to construct the functional elements of the Event Detector 30A and associated subsystems.

FIG. 3 is a block diagram of a conventional computing device 750 suitable for executing the method described hereinbelow. For example, the computer system 750 may be used in conjunction with an event detector previously described with respect to FIGS. 1 and 2, or an evaluation server, analysis station, counseling station, or supervisor station described in the Prior Applications. However, other computer systems and/or architectures may be used, as will be clear to those skilled in the art.

The computer system 750 preferably includes one or more processors, such as processor 752. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 752.

The processor 752 is preferably connected to a communication bus 754. The communication bus 754 may include a data channel for facilitating information transfer between storage and other peripheral components of the computer system 750. The communication bus 754 further may provide a set of signals used for communication with the processor 752, including a data bus, address bus, and control bus (not shown). The communication bus 754 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, mini PCI express, or standards promulgated by the Institute of Electrical and Electronics Engineers ("IEEE") including IEEE 488 general-purpose interface bus ("GPM"), IEEE 696/S-100, and the like.

Computer system 750 preferably includes a main memory 756 and may also include a secondary memory 758. The main memory 756 provides storage of instructions and data for programs executing on the processor 752. The main memory 756 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 758 may optionally include a hard disk drive 760 and/or a removable storage drive 762, for example a floppy disk drive, a magnetic tape drive, a compact disc ("CD") drive, a digital versatile disc ("DVD") drive, etc. The removable storage drive 762 reads from and/or writes to a removable storage medium 764 in a well-known manner. Removable storage medium 764 may be, for example, a floppy disk, magnetic tape, CD, DVD, memory stick, USB memory device, etc.

The removable storage medium 764 is preferably a computer readable medium having stored thereon computer executable code (i.e., software) and/or data. The computer software or data stored on the removable storage medium 764 is read into the computer system 750 as electrical communication signals 778.

In alternative embodiments, secondary memory 758 may include other similar means for allowing computer programs or other data or instructions to be loaded into the computer system 750. Such means may include, for example, an external storage medium 772 and an interface 770. Examples of external storage medium 772 may include an external hard disk drive or an external optical drive, or and external magneto-optical drive.

Other examples of secondary memory 758 may include semiconductor-based memory such as programmable read-only memory ("PROM"), erasable programmable read-only memory ("EPROM"), electrically erasable read-only memory ("EEPROM"), or flash memory. Also included are any other removable storage units 772 and interfaces 770, which allow software and data to be transferred from the removable storage unit 772 to the computer system 750.

Computer system 750 may also include a communication interface 774. The communication interface 774 allows software and data to be transferred between computer system 750 and external devices (e.g. printers), networks, or information sources. For example, computer software or executable code may be transferred to computer system 750 from a network server via communication interface 774. Examples of communication interface 774 include a modem, a network interface card ("NIC"), a communications port, a PCMCIA slot and card, an infrared interface, and an IEEE 1394 fire-wire, just to name a few.

Communication interface 774 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 774 are generally in the form of electrical communication signals 778. These signals 778 are preferably provided to communication interface 774 via a communication channel 776. Communication channel 776 carries signals 778 and can be implemented using a variety of wired or wireless communication means including wire or cable, fiber optics, conventional phone line, cellular phone link, satellite link, wireless data communication link, radio frequency (RF) link, or infrared link, just to name a few.

Computer executable code (i.e., computer programs or software) is stored in the main memory 756 and/or the secondary memory 758. Computer programs can also be received via communication interface 774 and stored in the main memory 756 and/or the secondary memory 758. Such computer programs, when executed, enable the computer system 750 to perform the various functions of the present invention as previously described.

In this description, the term "computer readable medium" is used to refer to any media used to provide computer executable code (e.g., software and computer programs) to the computer system 750. Examples of these media include main memory 756, secondary memory 758 (including hard disk drive 760, removable storage medium 764, and external storage medium 772) and any peripheral device communicatively coupled with communication interface 774 (including a network information server or other network device). These computer readable mediums are means for providing executable code, programming instructions, and software to the computer system 750.

In an embodiment that is implemented using software, the software may be stored on a computer readable medium and loaded into computer system 750 by way of removable storage drive 762, interface 770, or communication interface 774. In such an embodiment, the software is loaded into the computer system 750 in the form of electrical communication signals 778. The software, when executed by the processor 752, preferably causes the processor 752 to perform the inventive features and functions to be described hereinbelow.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Figure 4:
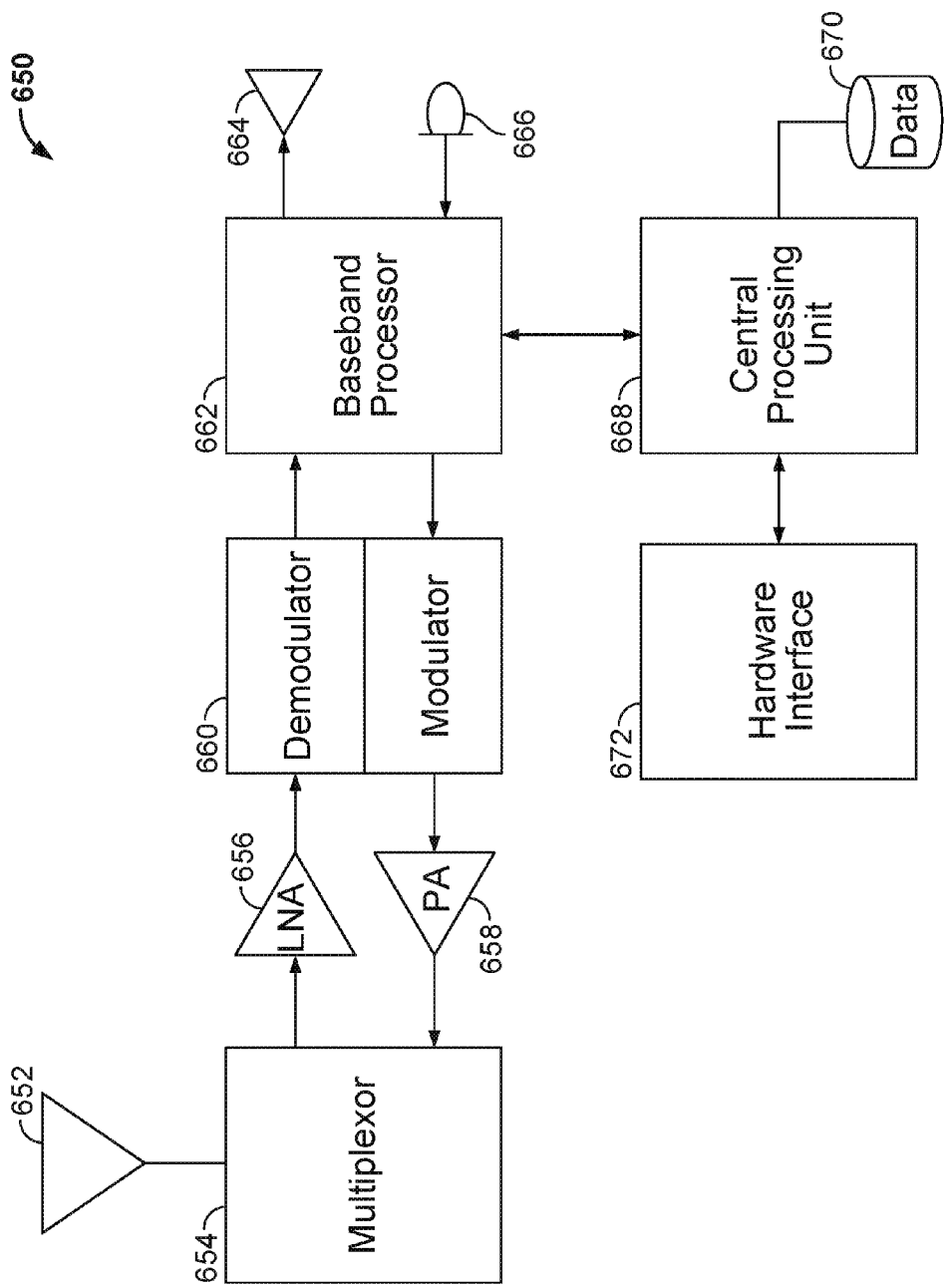
FIG. 4 is a block diagram of a conventional wireless communications device suitable for communicating between the event detector of FIG. 2 and a remote base unit.

FIG. 4 is a block diagram of a conventional wireless communications device 650 suitable for communicating between the event detector 30A of FIG. 2 and a remote base unit. For example, the wireless communication device 650 may be used in conjunction with an event detector previously described with respect to FIGS. 1 and 2, or an evaluation server, analysis station, counseling station, or supervisor station previously described in the Prior Applications. However, other wireless communication devices and/or architectures may also be used, as will be clear to those skilled in the art.

In the illustrated embodiment, wireless communication device 650 comprises an antenna 652, a multiplexor 654, a low noise amplifier ("LNA") 656, a power amplifier ("PA") 658, a modulation/demodulation circuit 660, a baseband processor 662, a speaker 664, a microphone 666, a central processing unit ("CPU") 668, a data storage area 670, and a hardware interface 672. In the wireless communication device 652, radio frequency ("RF") signals are transmitted and received by antenna 652. Multiplexor 654 acts as a switch method to couple two or more transmit and receive paths to two or more antennae paths, coupling antenna 652 between the transmit and receive signal paths. In the receive path, received RF signals are coupled from a multiplexor 654 to LNA 656. LNA 656 amplifies the received RF signal and couples the amplified signal to a demodulation portion of the modulation circuit 660.

Typically modulation circuit 660 will combine a demodulator and modulator in one integrated circuit ("IC"). The demodulator and modulator can also be separate components. The demodulator strips away the RF carrier signal leaving a base-band receive audio/data signal, which is sent from the demodulator output to the base-band processor 662.

If the base-band receive audio signal contains audio information (or really any data in the digital domain), then base-band processor 662 decodes the signal and converts it to an analog signal. Then the signal is amplified and sent to the speaker 664. The base-band processor 662 also receives analog audio signals from the microphone 666. These analog audio signals are converted to digital signals and encoded by the base-band processor 662. The base-band processor 662 also codes the digital signals for transmission and generates a base-band transmit audio signal that is routed to the modulator portion of modulation circuit 660. The modulator mixes the base-band transmit audio signal with an RF carrier signal generating an RF transmit signal and is routed to the power amplifier 658. The power amplifier 658 amplifies the RF transmit signal and routes it to the multiplexor 654 where the signal is switched to the antenna port for transmission by antenna 652.

The baseband processor 662 is also communicatively coupled with the central processing unit 668. The central processing unit 668 has access to a data storage area 670. The central processing unit 668 is preferably configured to execute instructions (i.e., computer programs or software) that can be stored in the data storage area 670. Computer programs can also be received from the baseband processor 662 and stored in the data storage area 670 or executed upon receipt. Such computer programs, when executed, enable the wireless communication device 650 to perform the various functions of the present invention as previously described.

In this description, the term "computer readable medium" is used to refer to any media used to provide executable instructions (e.g., software and computer programs) to the wireless communication device 650 for execution by the central processing unit 668. Examples of these media include the data storage area 670, microphone 666 (via the baseband processor 662), antenna 652 (also via the baseband processor 662), and hardware interface 672. These computer readable mediums are means for providing executable code, programming instructions, and software to the wireless communication device 650. The executable code, programming instructions, and software, when executed by the central processing unit 668, preferably cause the central processing unit 668 to perform the inventive features and functions previously described herein. It should be noted that the firmware used by the device 650 (or CPU 668) can be replaced/modified/upgraded via wired or wireless network transfer.

Figure 5:
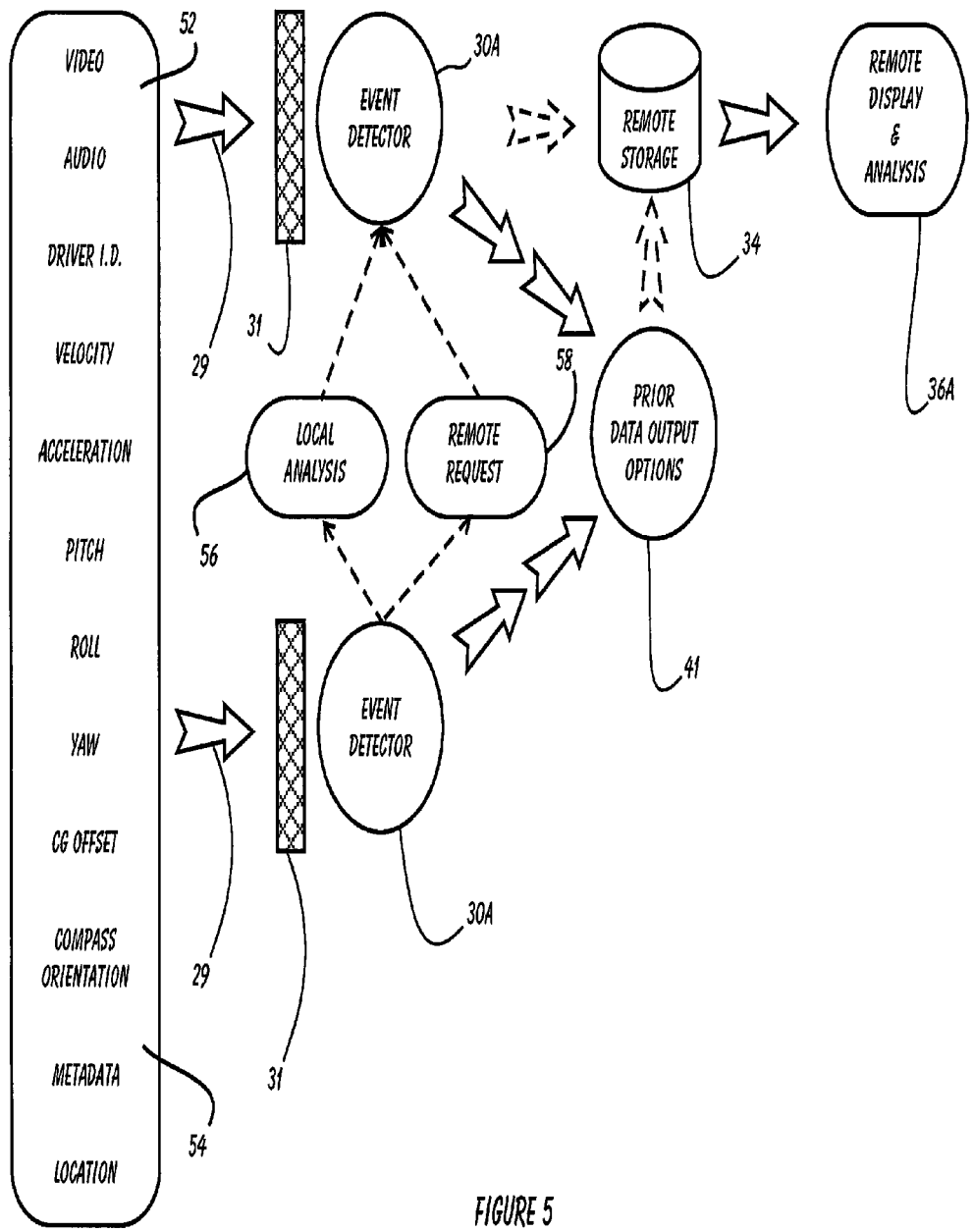
FIG. 5 is a block diagram depicting exemplary inputs to the event detector of FIGS. 1 and 2, and the potential response results and destinations for detected events.

The central processing unit is also preferably configured to receive notifications from the hardware interface 672 when new devices are detected by the hardware interface. Hardware interface 672 can be a combination electromechanical detector with controlling software that communicates with the CPU 668 and interacts with new devices. FIG. 5 depicts how the system of the present invention handles the data from the different sensor devices.

FIG. 5 is a block diagram depicting exemplary inputs to the event detector 30A of FIGS. 1 and 2, and the potential response results and destinations for detected events. The communications with an external evaluation server is extensively discussed in the Parent Applications, and is therefore not reproduced there, but is rather incorporated herein by reference.

As shown, event capture devices 20 (including inputs from the OBD and other vehicle equipment) can generate captured event data for velocity, acceleration (linear), pitch, roll, yaw. Center of gravity and CG offset may also be used. Vehicle orientation relative to compass heading, as well as vehicle location may be included in event data. Finally, audio, video and metadata (including driver ID) will likely be included.

The captured data 29 may be filtered by a real-time tunable raw data filter 31 before it is analyzed by the event detector 30A to determine whether or not a driving event of note has occurred. The criteria for making a type of driving event of note could be user-defined for their particular reason; such events of note may or may not otherwise be considered to be risky driving events, but are otherwise of interest to the user.

As discussed above in connection with FIG. 2, different types of sensor data 29 will be handled in different manners by the present system. For the purpose of clarity, we have here divided the sensor data 29 into two groups of data: regularly uploaded data 54 and selectively uploaded data 52. The idea is that primarily the less bandwidth-demanding data is regularly uploaded to the remote server from the vehicle. The higher bandwidth data would be retained aboard the vehicle until it is manually requested, automatically identified as being "of interest", or for periodic record-keeping purposes (which very well may be accomplished via wired or wireless connection while the vehicle is under a maintenance status).

Here, the video and audio data and telemetry data have been included within the selectively uploaded data 52. As mentioned above, the expectation would be that this data would not normally be included in the regular wireless data flow from the event detector 30A to the remote server unless certain conditions are met. Since the audio and particularly the video data demands large bandwidth for transfer, the data of these streams would generally be stored locally. Driver ID is also included within the selectively uploaded data 52, since the objective evidence of the driver's identity (such as a video clip) may not be obtained until commanded as such by the event detector 30A (such as right after the local event scoring module 140 (see FIG. 2) determines that an event of interest has transpired. At that point, any remote user receiving the video and audio data would most likely be very interested in confirming the identity of the driver (since the goal would be to transfer the data 52 when there is a vehicular crash or near miss).

One factor that might be used to determine whether or not an "event of interest" has transpired is related to the nature of the forces (i.e. of the accelerometer) being sensed. Certain forces (e.g. shock) have been identified as being automatically "of interest," even without any real onboard analysis of the entire set of data streams being analyzed.

The regularly uploaded data 54 is handled as discussed in the prior applications, that is, initial filtering 31 may be performed on the data in order to reduce false event occurrences. The event detector 30A will convey the regularly uploaded data 54 as described in the Parent Applications (incorporated herein by reference) and identified as the prior data output options 41 (summarized below in connection with FIG. 6).

If activated, the local event scoring module 140 (see FIG. 2) will conduct local analysis 56 of the regularly uploaded data 54 in order to calculate a local event score. If the local event score so determines, the selectively uploaded event data 52 will be transmitted to remote storage 34 (at the remote server) for display/review/analysis (e.g. scoring) remote to the vehicle.

A remote request 58 (from a remote user or system) will also trigger the data 52 to be uploaded to remote storage 34 for remote display and analysis 36A. As should be apparent, those transfer paths responsive to the local analysis 56 or remote request 58 are identified by dashed lines.

It should be understood that the depicted classifications of data as being part of the "selectively uploaded" data 52 versus the "regularly uploaded" data 54 is only one possible arrangement. In other forms, and when certain system settings are chosen, the system (either the local system aboard the vehicle or the remote server) may send one or more designated persons a message (email, SMS, etc.) that will include a brief alert message that there has been an "incident" in a vehicle (or more than one vehicle). The user may then be able to select a "hyperlink" that will act as a user request to download the selected data from the system (either the vehicle or the central remote server or related assemblies). The data being downloaded in response to the user request would normally be video and/or audio data, but it could also include other data points or data streams, such as vehicle location coordinates (e.g. via GPS), incident type or classification (e.g. "crash," "vehicle flip over," "excessive speed," etc.).

Furthermore, the user's request after being alerted of the incident may either be serviced by the remote server system, or by the vehicle-borne system. As such, the selectively uploaded data 52 may not be uploaded to the server until after a user has requested it. Also, the alert message to the user (which usually would not include any large bandwidth, selectively uploaded data 52) may have more than one data upload option. For example, the user may be given the options of: (a) uploading a short video clip including vehicle GPS location and speed; (b) uploading actively streaming video and audio directly from the vehicle; or (c) uploading current video/audio data plus similar data from some period of time prior to the incident having occurred.

If neither the local analysis 56, or remote request 58 is received by the event detector 30A, then the data 52 will be handled according to the prior data output options as more fully described in the Continuation Applications, herein incorporated by reference. Having now reviewed the basic arrangement of the system of the present invention and critical elements thereof, we can direct our attention to the driver-centric features of the latest improvement to the inventions of the Parent and Continuation Applications.

Figure 6:
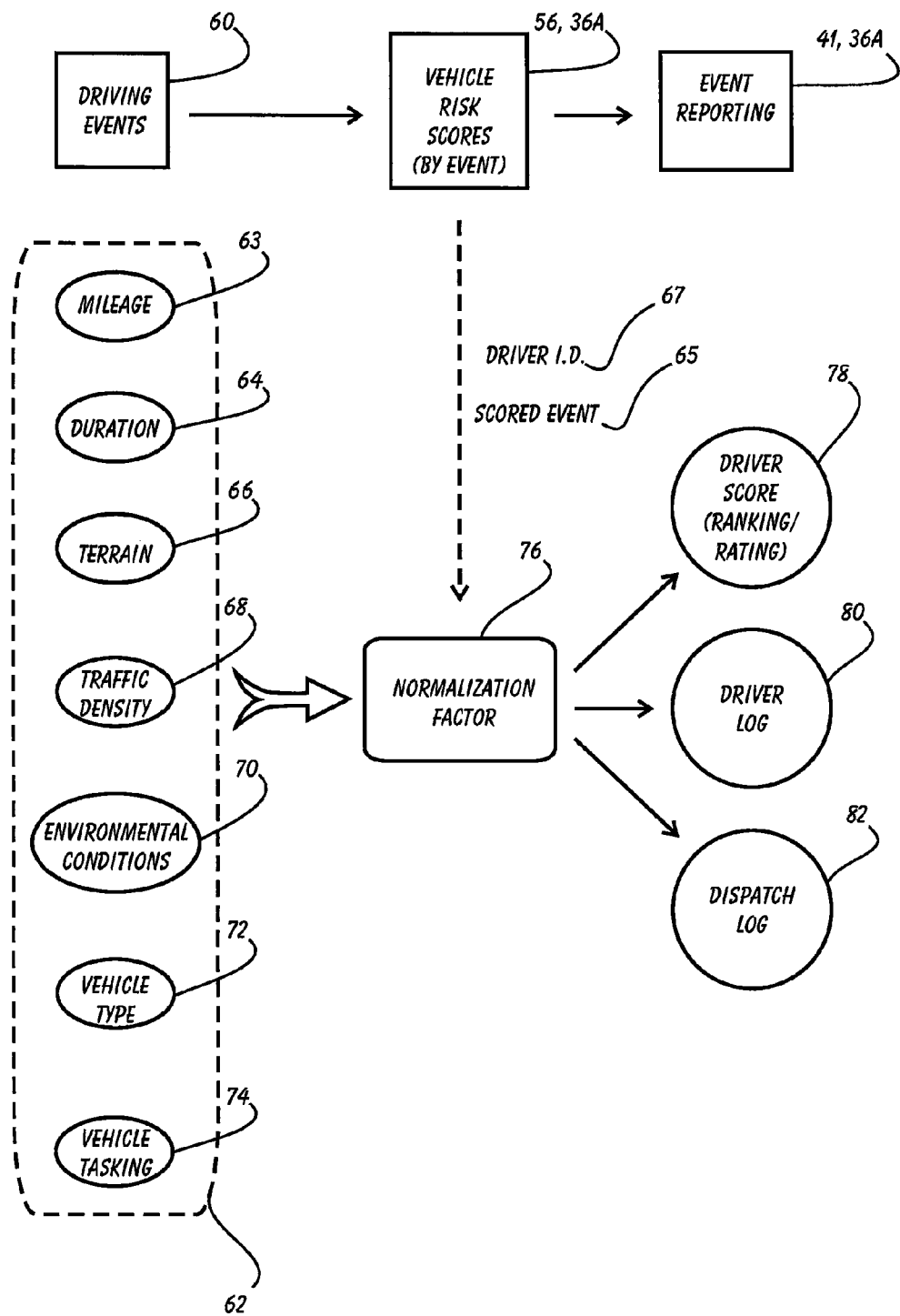
FIG. 6 is a block diagram of the logic flow related to driver score normalization and reporting.

FIG. 6 is a block diagram of the logic flow related to driver score normalization and reporting of the present invention. The sensors and/or event detector identifies driving events 60 (or suspected driving events) based upon the data detected by the sensors themselves (and their respective threshold settings). Once triggered, the event data is analyzed either locally 56 or remotely 36A, to determine a score for each event. As discussed in the Parent and Continuation Applications, the "score" as it applies to a driving event is the result of a qualitative review of the triggered events—as such, it can also be viewed as a "verification" that the triggered driving event is an actual risky driving occurrence. Therefore, the "score" of a driving event 60 is actually a confidence level that is determined either by a human reviewer of the recorded video/audio and other sensor data, or via automated scoring where the historical accuracy of certain system-predicted driving events is used to either confirm or disprove the predicted driving events 60.

Once scored 56, 36A, the event reporting 41, 36A will proceed as previously discussed in the Parent and Continuation Applications.

While driving events 60 are monitored, analyzed and reported in a vehicle-centric perspective; that is to say that within a fleet of vehicles, it is the vehicle and its equipment and condition that is tracked by the client/owner. Of course, the vehicle does not operate itself. While certain vehicle traits or conditions may impact the propensity for its experiencing risky driving events, it is generally believed that the primary contributor to vehicle safe (or unsafe) operations is the driver of the vehicle. Consequently, it is also important to compile vehicle event data in a driver-centric way. Tracking a driver's driving event history opens up the possibility for much more effective driver supervision, coaching, and performance accountability. This should translate into fewer risky driving events.

The problem with comparing one driver's risky driving history with that of other drivers is that not all drivers engage in the same driving experience. One would expect that a driver that drives only in daytime hours, in good weather, and in low traffic conditions will exhibit riskier driving behavior than a driver who drives in traffic in poor visibility and/or weather. The vehicle event recording system 10 is not generally configured to take such factors into account in generating driving events 60 because there is a potential for the under-reporting of driving events. It is preferable to focus on the vehicle's spatial motion when generating driving event reports, since it is the spatial motion of the vehicle that actually defines whether or not risky driving behavior is observed.

In order to conduct driver-centric driving event analysis, each scored driving event 65 must include the driver I.D. 67. Each of these scored driving events 65 are then adjusted by a normalization factor 76 before being finally attributed to the identified driver. The purpose behind the application of a normalization factor 76 to a scored driving event is to give the driver credit for driving well under below-average conditions (or vice-versa).

The normalization factor 76 is derived from consideration of a series of driver challenge factors 62. Example of potential challenge factors 62 are depicted here in FIG. 6. Not all of these factors 62 are necessarily included in arriving at each normalization factor 76, since data for all factors 62 may not be available for each and every vehicle and/or scored event 65.

The amount of mileage 63 driven by a particular driver during a standardized period of time (e.g. by shift, day or week) is expected to have an affect on driver performance. It is expected that the more miles driven by a driver, the better the odds that the driver will experience a risky driving event. Consequently, a driver having a higher number of miles without incident is given credit as compared to a driver having fewer miles without incident. The mileage traveled by a driver in a vehicle is generally reported by the vehicles onboard computer (measuring from when the driver commences each trip to when the driver concludes each trip). In other embodiments, mileage may be computed from GPS data (again measuring driver trip lengths).

Duration (time) driven 64 by a driver, such as during a shift or day, is also considered in arriving at the normalization factor 76. A driver driving for longer periods of time within a standard period of time would be expected to have a higher likelihood of a risky driving event. Therefore, total elapsed trip time by driver is considered in arriving at the normalization factor 76. Driver trip time would generally be sensed by the vehicle onboard computer, but the event detector/driver identification module could also be configured to monitor trip duration by driver.

The road condition and/or terrain 66 over which a driver's vehicle travels can impact the difficulty that the driver has in avoiding accidents or other driving incidents. Poor road conditions could impact steering accuracy, tire traction, and vehicle tracking (tendency to go straight). Similarly, hilly roads would generally create an elevated risk for accidents. The road condition and/or terrain could be obtained by a variety of approaches. A library of road terrains and/or conditions could provide a basic level of information. Sensors in the vehicle (e.g. accelerometers, orientation detectors, audio sensors) could also detect sound, vibrations, pitch/yaw, etc. to conclude what the road condition and/or terrain conditions are.

The amount of vehicular traffic or traffic density 68 in which a vehicle is immersed certainly will affect the level of driving hazard to a driver. Traffic density can be determined (or estimated) by a variety of methods: (1) through video recognition of vehicle density; (2) by geographic mapping to indicate predicted traffic patterns for different time periods (and days of the week); (3) by detecting vehicle speed and stop-starting as compared to posted speed limits and traffic control devices. Other methods may also be contrived to use new or existing vehicle sensors or library data.

Environmental conditions 70, such as ambient lighting, visibility, weather status and other factors will either raise or lower the propensity for vehicle accidents or incidents. Broadcast weather information could be coupled with event detection, or onboard sensors could detect or predict the weather and other environmental conditions. Video and/or audio sensors could detect ambient light conditions, existence of precipitation and even visibility.

The type of vehicle 72 being driven could have substantial affect on a driver's incident risk. A passenger vehicle would tend to be safer (and less likely by its nature to be risky to drive) than a city bus or some utility vehicle. While onboard sensors could detect vehicle motion characteristics in order to provide some level of vehicle type or classification conclusion, it usually is also a part of the initialization data for the event recording system, since the vehicle type is an important factor used in the interpretation of accelerometer and other data.

Finally (in this example), vehicle tasking 74 can have an affect on the hazards presented to a driver. A delivery vehicle would generally have a tendency to be more risky than a salesperson's vehicle. Similarly, a dump truck might have a tendency to be more risky to drive than a delivery vehicle. Vehicle tasking 74 may or may not be directly connected to the vehicle type 72. Consequently, the initialization data for the vehicle might be the source of the vehicle tasking 74 data.

Some or all of these driver challenge factors 62 could be used to create one or a series of normalization factors 76 to be applied to an individual driver's driving record. The result is a final driver score 78. The score 78 could be relative to a particular fleet of drivers, or it could be relative to all drivers for which driving performance is being monitored, or trends for individual drivers could be scored/monitored. Driver score 78 is a numerical representation meant to rank or grade a driver, based upon the challenge factors 62 and their effect on scored driving events occurring during a driver's trip(s). This differs from the event score, which is more of a representation of the confidence in the predicted event.

Figure 7:
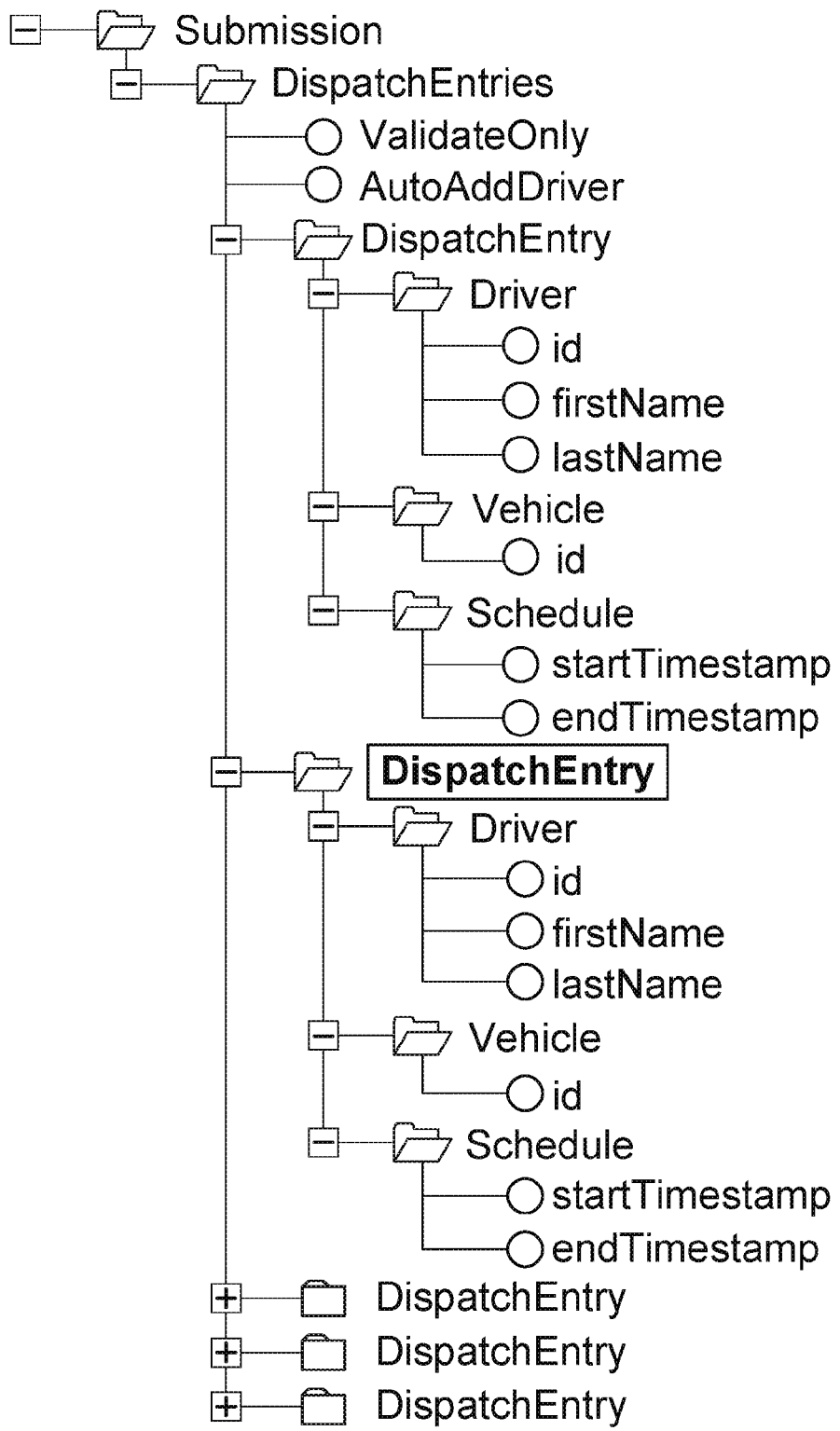
FIG. 7 is an example dispatch log generated by the system and method of the present invention.

FIG. 7 is an example dispatch log 82 generated by the system and method of the present invention. The dispatch log 82 created by the system of the present invention is an automated series of trip log entries 83 for a particular operational group of vehicles and drivers. A trip log entry 83 is created each time that a vehicle is used for a driving trip. The entries 83 include driver identification 84, vehicle identification 85 and elapsed time information 87. Other trip-related information 91 may be included, either directly or indirectly, in each trip log entry 83, such as the driver challenge factors identified above in connection with the discussion related to FIG. 6. For example, mileage, terrain, traffic density, environmental conditions may be included in the trip log entry 83. Vehicle type and vehicle tasking may be treated as vehicle characteristics or factors that are coupled or linked to the vehicle information or identity 85.

The driver log discussed above in connection with FIG. 6 would be a compilation or sorting of trip log entries from the dispatch log 82 that are those trips driven by a particular driver. A normalization factor (see FIG. 6) may be assigned "on the fly" in real-time as another piece of other trip-related information 91 within the trip log entries 83, or it may be produced by the system on demand at some later time. The driver score (see FIG. 6) could be a compilation of driving events (or non-events) experienced during a particular trip, or alternatively it could be updated on an ongoing basis on a pre-established periodicity (e.g. weekly, by a certain elapsed mileage, or by a pre-determined number of trips).

Figure 8:
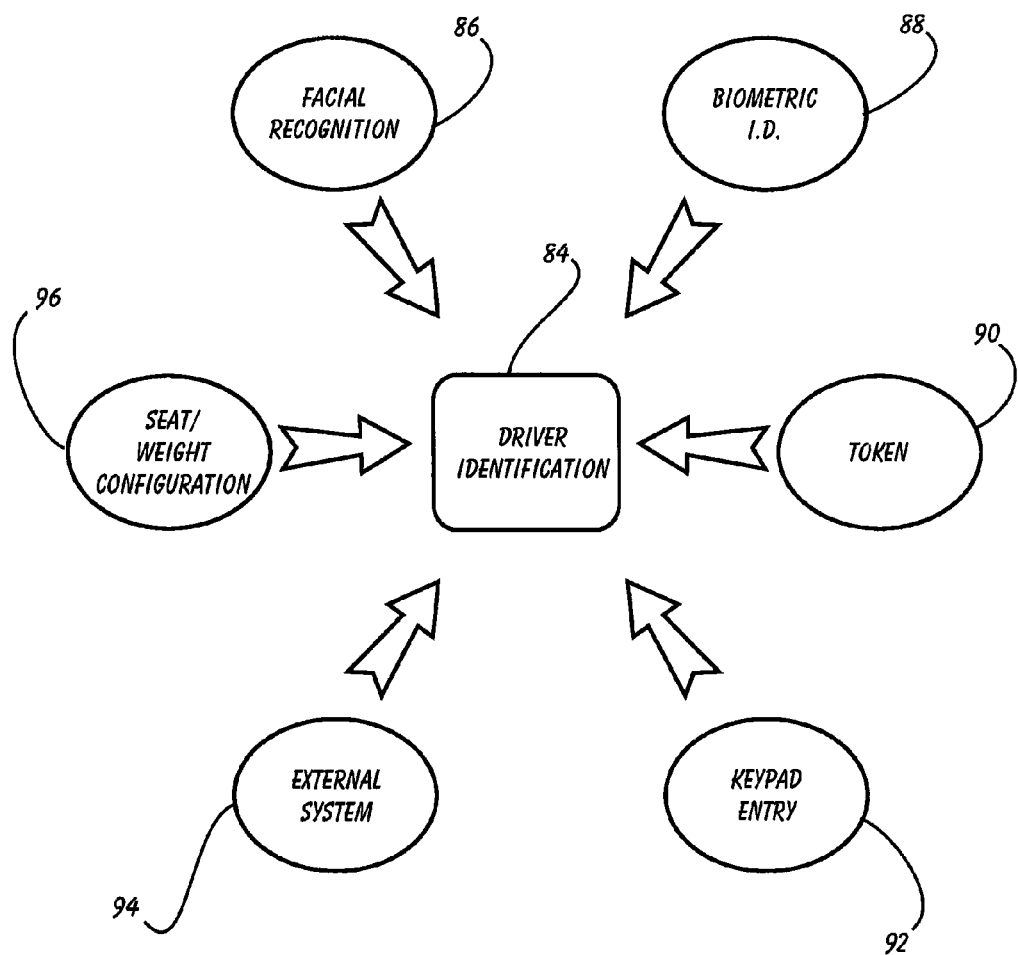
FIG. 8 is a block diagram depicting the group of potential driver identification parameters.

FIG. 8 is a block diagram depicting the group of potential driver identification parameters. As discussed above, identifying the driver 84 for each driving trip is a critical aspect of the functionality of the system of the present invention. This is the functional purpose of the driver ID module 116.

The module 116 may identify the vehicle driver via facial recognition methodology 86. That approach begins by taking a video sample of the drive's face (typically using one of the pre-existing video recorders incorporated within the vehicle event recorder), and applying facial recognition methodology to create a data file representing that driver's face. The driver's facial data file is compared to a repository of data files for all eligible drivers of the vehicle; the driver's identity is ascertained when a match is achieved.

Fingerprints, retinal scan, voice recognition, or other biometric identification approaches 88 may be used. Again, the vehicle driver's biometric data is compared to data retained in a driver data repository for biometric identity data.

The drivers may be issued security tokens 90 that cycle through a series of passwords synchronously with an internal password generator within the remote server computer. The driver would enter his or her password, as obtained from the token, into the event recorder system before the vehicle was activated and the driving trip commenced. Similarly, yet less securely, a simple keypad password entry 92 could be used to identify the driver from a group of authorized drivers.

A stand-alone, external system or subsystem 94 might be used to identify the driver. For example, a dispatcher may remotely "issue" a vehicle to a driver. Until the vehicle is returned to "inventory" (after the driver's trip or shift is complete), driving trips using that vehicle would be attributed to that driver.

A final example would be to use the driver seat sensors within the vehicle to weigh the driver when he or she sits in the driver's seat 96. While this approach may not be accurate enough to operate as a stand-alone method for driver I.D., it might be used to supplement one of the other aforementioned methods.

The individual driver identity data repositories may be combined into a single data repository containing all driver identity data (i.e. for all of the different identification methods), or there may be a series of separate data repositories.

While there is a long list of approaches listed herein, these are exemplary only—other methods or approaches might be utilized, depending upon the particular system (and vehicle) design.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A system for driving score generation, comprising:
   an interface configured to receive driving data comprising sensor data from one or more sensors on a vehicle; and
   a processor configured to:
   generate a drive event score for a driving trip of the vehicle based at least in part on the driving data;
   normalize the drive event score based at least in part on one or more challenge factors; and
   generate a driver score based at least in part on the normalized event score,
   wherein the driver score comprises a numerical representation used to rank a driver based at least in part on the one or more challenge factors and an effect of the one or more challenge factors on the driving trip.

2. The system of claim 1, wherein the sensor data comprises one or more of the following: a speed, a direction, a global positioning coordinate, a moisture level, or a temperature.

3. The system of claim 1, wherein the processor is configured to assign a risk identifier to the driving data prior to assigning the drive event score.

4. The system of claim 1, wherein the drive event score is based at least in part on one or more of the following: an acceleration, a velocity, a video, or a sound.

5. The system of claim 1, wherein the driving data is uploaded via a cellular telephone network or a satellite network.

6. The system of claim 1, wherein large bandwidth data stream transmittal of the driving data is regulated by determining whether the driving data is to be transmitted.

7. The system of claim 1, wherein the driving data is uploaded upon manual or remote user request.

8. The system of claim 1, wherein the processor is further to generate a driving data log for the driver comprising a record of the driver's driving trips and indicia regarding whether or not the driver's driving trips are in compliance with a driving trip limitation.

9. The system of claim 1, wherein the processor is further to generate a dispatch driving data log for a dispatch group of the vehicle and one or more vehicles, wherein the dispatch driving data log comprises a record of driving trips associated with the vehicles of the dispatch group.

10. The system of claim 1, wherein the processor is further to identify the driver of the vehicle.

11. The system of claim 1, wherein the driver is identified using facial recognition for analyzing video of a driver's face and comparing it to data in a facial data base.

12. The system of claim 1, wherein the driver is identified using a driver weight sensor for analyzing a driver's weight and comparing it to data in a driver weight data base.

13. The system of claim 1, wherein the driver is identified using a driver biometric sensor for analyzing a driver's biometric data and comparing it to data in a driver biometric data base.

14. The system of claim 1, wherein the driver is identified using a driver password.

15. The system of claim 1, the driver score is normalized based at least in part on a driver challenge factor, wherein the driver challenge factor comprises an incline condition, a curvaceousness condition, a density of other vehicles in a proximity to the vehicle during the driving trip, a vehicle type involved in the driving trip, a mileage amount, a trip duration, a road condition, or a vehicle tasking during the driving trip.

16. The system of claim 1, the driver score is normalized based at least in part on a driver challenge factor, wherein the driver challenge factor comprises an ambient light condition, existence of precipitation, a visibility, or an environmental condition.

17. The system of claim 1, wherein a trend for the driver is monitored using the driver score.

18. A method for driving score generation, comprising:
   receiving a driving data comprising sensor data from one or more sensors on a vehicle;
   generating, using a processor, a drive event score for a driving trip of the vehicle based at least in part on the driving data;
   normalizing the drive event score based at least in part on one or more challenge factors; and
   generating a driver score based at least in part on the normalized event score, wherein the driver score comprises a numerical representation used to rank a driver based at least in part on the one or more challenge factors and an effect of the one or more challenge factors on the driving trip.

19. A computer program product for driving score generation, the computer program product being embodied in a non-transitory computer readable storage medium and comprising computer instructions for:
   receiving a driving data comprising sensor data from one or more sensors on a vehicle;
   generating a drive event score for a driving trip of the vehicle based at least in part on the driving data;
   normalizing the drive event score based at least in part on one or more challenge factors; and
   generating a driver score based at least in part on the normalized event score, wherein the driver score comprises a numerical representation used to rank a driver based at least in part on the one or more challenge factors and an effect of the one or more challenge factors on the driving trip.

* * * * *